United States Patent
Nakagawa

(10) Patent No.: US 10,470,471 B2
(45) Date of Patent: Nov. 12, 2019

(54) BAKED CONFECTIONERY

(71) Applicant: KAO CORPORATION, Tokyo (JP)

(72) Inventor: Tomohiro Nakagawa, Funabashi (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/655,942

(22) PCT Filed: Dec. 26, 2013

(86) PCT No.: PCT/JP2013/084993
§ 371 (c)(1),
(2) Date: Jun. 26, 2015

(87) PCT Pub. No.: WO2014/104249
PCT Pub. Date: Jul. 3, 2014

(65) Prior Publication Data
US 2015/0374001 A1    Dec. 31, 2015

(30) Foreign Application Priority Data
Dec. 28, 2012  (JP) .................. 2012-286931

(51) Int. Cl.
*A21D 13/02*    (2006.01)
*A23G 3/50*    (2006.01)
*A21D 2/18*    (2006.01)
*A23G 3/40*    (2006.01)

(52) U.S. Cl.
CPC .............. *A21D 13/02* (2013.01); *A21D 2/186* (2013.01); *A23G 3/40* (2013.01); *A23G 3/50* (2013.01); *A23V 2002/00* (2013.01)

(58) Field of Classification Search
CPC . A23G 3/50; A23G 3/40; A21D 2/186; A21D 13/08; A21D 13/02; A23V 2002/00
USPC ........................................................ 426/549
See application file for complete search history.

(56) References Cited

U.S. PATENT DOCUMENTS

| 2007/0237880 A1 | 10/2007 | Coleman et al. |
| 2009/0053379 A1 | 2/2009 | Kimura et al. |
| 2010/0303991 A1 | 12/2010 | Karwowski et al. |

FOREIGN PATENT DOCUMENTS

| JP | 57 170157 | 10/1982 |
| JP | 11075746 A | * 3/1999 |
| JP | 11 313627 | 11/1999 |
| JP | 2004 298179 | 10/2004 |
| JP | 2007 275066 | 10/2007 |
| JP | 2008 125492 | 6/2008 |
| JP | 2009 534041 | 9/2009 |
| JP | 2010 279352 | 12/2010 |
| JP | 2014 140365 | 8/2014 |

OTHER PUBLICATIONS

Fao "Major Chemical Compounds in Cereal Grains" http://www.fao.org/docrep/x2184e/x2184e04.htm. accessed Sep. 23, 2016.*
JP11-075746A (published Mar. 1999) Machine translation.*
Hou et al. Cereal Chemistry 73(3): 352-357.*
International Search Report dated Mar. 11, 2014 in PCT/JP2013/084993 filed Dec. 26, 2013.
Kuragano, T. et al., "Effects Gliadin and Glutenin on Physical Properties of Cookies", J. Home Economics of Japan, vol. 42, No. 1, pp. 45-52, 1991(with English abstract).
Arai, E. et al., "Effects of Gluten-Constituent Protein Compositions on Chewing and Swallowing Characteristics of Cookies", The Japanese journal of dysphagia rehabilitation, vol. 10, No. 2, pp. 142-151, 2006 (with partial translation).
Bugyi, Z. et al., "Development of Incurred Refence Material for Improving Conditions of Gluten Quantification", J. AOAC Intl.,, vol. 95, No. 2, pp. 382-387, 2012.
Jeltema, M. A., et al., "Prediction of Cookie Quality from Dietary Fiber Components", Cereal Chem., vol. 60, No. 3, 227-230, 1983.
Nagao, S., "Science of wheat", first edition, Asakura Publishing Co., Ltd., pp. 83-84, 1998.
Nagao, S., "Science of wheat", first edition, Asakura Publishing Co., Ltd., pp. 38-39, 1998.
Kagawa, A., "Table of food composition", first edition, Kagawa Nutrition University Publishing Division , pp. 44-47, 1998.
Nagao, S., "Science of wheat", first edition, Asakura Publishing Co., Ltd. vol. 42, No. 1, pp. 92-94, 1998.
Takano-Ishikawa, Y., "Functionality and nutraceutical use of wheat of wheat products", Journal of the Japan Association for the Integrated Study of Dietary Hobits. vol. 19, No. 2, pp. 116-123, 2008 (with English abstract).

* cited by examiner

*Primary Examiner* — Subbalakshmi Prakash
(74) *Attorney, Agent, or Firm* — Oblon, McClelland, Maier & Neustadt, L.L.P.

(57) ABSTRACT

Baked confectionery containing insoluble dietary fiber in an amount of from 5.0 to 20.0 mass % and starch in an amount of from 20 to 45 mass %, wherein a content of gliadin in the baked confectionery is 1.1 mass % or less, and the insoluble dietary fiber contains insoluble dietary fiber derived from bran of wheat variety.

11 Claims, No Drawings

BAKED CONFECTIONERY

FIELD OF THE INVENTION

The present invention relates to baked confectionery.

BACKGROUND OF THE INVENTION

Wheat-variety hull, also called bran, is attracting attention as a material of health foods, since it is rich in insoluble dietary fiber, vitamins, minerals and the like. Whole wheat flour obtained by milling whole wheat grains including their hulls is reported to have a hypotensive effect and an abdominal fat reducing effect, and also reported to reduce risk of mortality of diabetic patients.

In baked confectionery made from wheat variety as a main ingredient, such as cookies, biscuits and low-calorie snack bars, soft and good melt-in-the-mouth food texture is generally favored. Moreover, finishing in little burnt deposit and uniform baked color not only develops brightness in appearance but also may further improve food texture and flavor. However, when the whole wheat flour, which is rich in insoluble dietary fiber, is used as the main ingredient of the baked confectionery, the food texture becomes hard and the melt-in-the-mouth is also deteriorated. Moreover, the burnt deposit resulting from being baked is easily caused, and therefore in order to keep bright appearance, a restriction in production has been imposed, such as a need of elaborate control of baking conditions.

SUMMARY OF THE INVENTION

The present invention provides baked confectionery containing insoluble dietary fiber in an amount of from 5.0 to 20.0 mass % and starch in an amount of from 20 to 45 mass %, wherein a content of gliadin in the baked confectionery is 1.1 mass % or less, and the insoluble dietary fiber comprises insoluble dietary fiber derived from bran of wheat variety.

Further, the present invention provides a method of producing baked confectionery, in which the method includes blending at least from 1 to 90 mass parts of saccharide and from 1 to 150 mass parts of fat and oil with 100 mass parts of a total amount of ingredients (A) and (B) shown below, to thereby prepare dough containing insoluble dietary fiber in an amount of from 4.5 to 17.0 mass %, starch in an amount of from 15 to 40 mass % and gliadin in an amount of 0.95 mass % or less, and baking the dough:
(A) from 21 to 60 mass parts of insoluble dietary fiber-containing powder containing bran of wheat variety; and
(B) starch in an amount of mass parts to be 100 mass parts in a total including the (A).

In the present specification, when the term "insoluble dietary fiber" is simply used as an ingredient in the baked confectionery, the term "insoluble dietary fiber" means whole insoluble dietary fiber contained in the baked confectionery.

Other and further objects, features and advantages of the invention will appear more fully from the following description.

DETAILED DESCRIPTION OF THE INVENTION

The present invention is contemplated for providing a baked confectionery that has softer and smoother food texture, good melt-in-the-mouth and bright appearance, even though the confectionery is rich in insoluble dietary fiber.

In view of the above-described problem, the inventors of the present invention diligently continued to conduct study. Then, the inventors of the present invention found that, in the baked confectionery abundantly containing the insoluble dietary fiber, when a gliadin content is suppressed in a specific range, hardness is improved to give softer food texture, and also the baked confectionery is finished in good melt-in-the-mouth. Further, the inventors of the present invention found that the baked confectionery above is hard to develop burnt deposit color under ordinary baking conditions, and has bright appearance even after being baked. The present invention has been completed based on these findings.

The baked confectionery of the present invention is described in detail below.

"Baked confectionery" in the present invention means a biscuit, a cookie, a cracker, a hardtack, a pretzel, a pie, cut bread, shortbread, or the like as described in "Seikajiten (Confectionery Dictionary)," page 204, the first edition, Oct. 30, 1981. The baked confectionery preferably includes a biscuit, a cookie, a cracker, a hardtack, a pretzel, a pie, cut bread, or the like specified in the Fair Competition Code in 1971.

More specifically, in the present invention, "baked confectionery" means a product that is different from bread prepared by baking dough after many gas bubbles are incorporated therein by fermenting the dough with yeast, and also different from cake prepared by baking dough after many gas bubbles are incorporated therein by adding baking powder, meringue or the like to the dough, although the baked confectionery is obtained by baking dough containing farina, and fat and oil "Baked confectionery" of the present invention contains few gas bubbles, and has lower elasticity, higher penetration strength, a lower moisture content, and also lower water activity in comparison with the bread and the cake.

The baked confectionery of the present invention contains a specific amount of specific insoluble dietary fiber and starch, and the gliadin content is suppressed in the specific range.

The baked confectionery of the present invention contains insoluble dietary fiber derived from bran of wheat variety. The baked confectionery of the present invention may further contain, in addition to the insoluble dietary fiber derived from the bran of wheat variety, one kind or two or more kinds of insoluble dietary fiber other than the insoluble dietary fiber derived from the bran of wheat variety.

"Dietary fiber" means a whole of hardly-digestible ingredients in food, the ingredients being not digested by a human digestive enzyme, and among them, one that is hard to be dissolved into water is called the insoluble dietary fiber. The insoluble dietary fiber is not particularly limited, and may be derived from cereal, legumes, fruits, green goods or the like, such as cellulose and hemicellulose, or may be derived from shells of crustacea, such as chitin and chitosan, or cell walls of fungi.

In addition, "bran" herein is used in broad sense, including hulls of wheat, and also hulls of wheat variety other than the wheat.

Specific examples of the above-described wheat variety include wheat, barley, rye and oats. The insoluble dietary fiber contained in the baked confectionery of the present invention preferably contains insoluble dietary fiber derived from one kind or two or more kinds selected from wheat bran and barley bran, and further preferably contains insoluble dietary fiber derived from wheat bran.

In the baked confectionery of the present invention, a ratio of the insoluble dietary fiber derived from the bran of wheat variety (more specifically, one kind or two or more kinds selected from the wheat, the barley, the rye and the oats) in the whole insoluble dietary fiber is preferably 20 mass % or more. More specifically, the ratio is preferably from 20 to 100 mass %, more preferably from 40 to 100 mass %, more preferably from 60 to 100 mass %, more preferably from 70 to 100 mass %, more preferably from 80 to 100 mass %, more preferably 90 to 100 mass %, and more preferably 100 mass %.

Moreover, in the baked confectionery of the present invention, the above-described insoluble dietary fiber derived from the bran of wheat variety in the above-described whole insoluble dietary fiber preferably includes the insoluble dietary fiber derived from one kind or two or more kinds selected from the wheat bran and the barley bran, and a ratio of the insoluble dietary fiber derived from one kind or two or more kinds selected from the wheat bran and the barley bran in the insoluble dietary fiber derived from the bran of wheat variety is preferably 50 mass % or more, more preferably 70 mass % or more. More specifically, the ratio is preferably from 50 to 100 mass %, more preferably from 70 to 100 mass %, more preferably from 80 to 100 mass %, more preferably from 90 to 100 mass %, and more preferably 100 mass %.

The insoluble dietary fiber derived from one kind or two or more kinds selected from the above-described wheat bran and barley bran preferably includes the insoluble dietary fiber derived from the wheat bran, and a ratio of the insoluble dietary fiber derived from the wheat bran in the insoluble dietary fiber derived from one kind or two or more kinds selected from the wheat bran and the barley bran is preferably 50 mass % or more, and more preferably 70 mass % or more. More specifically, the ratio is preferably from 50 to 100 mass %, more preferably from 70 to 100 mass %, more preferably from 80 to 100 mass %, more preferably from 90 to 100 mass %, and more preferably 100 mass %.

More specifically, the insoluble dietary fiber contained in the baked confectionery of the present invention is preferably derived from the wheat bran.

A content of the insoluble dietary fiber in the baked confectionery of the present invention is from 5.0 to 20.0 mass %. In view of a physiological effect of the insoluble dietary fiber, the content of the insoluble dietary fiber in the baked confectionery of the present invention is preferably 5.5 mass % or more, more preferably 6.0 mass % or more, more preferably 7.0 mass % or more, more preferably 8.0 mass % or more, more preferably 9.0 mass % or more, and more preferably 10.0 mass % or more. Moreover, in view of food texture, the content of the insoluble dietary fiber in the baked confectionery of the present invention is preferably 18.0 mass % or less, more preferably 16.0 mass % or less, more preferably 15.0 mass % or less, more preferably 14.0 mass % or less, and more preferably 13.0 mass % or less, and may be 11.0 mass % or less, or 10.0 mass % or less, or 9.0 mass % or less, or 8.0 mass % or less. When both sides of the physiological effect and the food texture are taken into consideration, the content of the insoluble dietary fiber in the baked confectionery of the present invention is preferably from 5.5 to 18.0 mass %, more preferably from 6.0 to 16.0 mass %, more preferably from 6.0 to 15.0 mass %, more preferably from 6.0 to 14.0 mass %, and more preferably from 6.0 to 13.0 mass %. Moreover, the content is also preferably from 5.0 to 11.0 mass %.

In the present invention, the content of the insoluble dietary fiber can be measured according to the method described in Examples as described later.

The baked confectionery of the present invention contains one kind or two or more kinds of starch. The starch is not particularly limited, and may be amylose or amylopectin, but is preferably a mixture thereof. An amylose content in the starch is preferably from 10 to 50 mass %, and more preferably from 15 to 40 mass %. An origin of the starch is not particularly limited, and specific examples include one kind or two or more kinds selected from wheat-variety starch such as wheat starch, barley starch, rye starch and oats starch; corn starch; rice starch; legumes starch; potato starch; sweet potato starch; tapioca starch; water chestnut starch; chestnut starch; sago starch; yam starch; lotus root starch; arrowhead starch; bracken starch; lily bulb starch; and amylomaize starch. The baked confectionery of the present invention preferably contains one kind or two or more kinds selected from the wheat starch and the corn starch. Moreover, the starch contained in the baked confectionery of the present invention may be gelatinized.

A starch content in the baked confectionery of the present invention is from 20 to 45 mass %. From viewpoints of brightness in appearance, and the melt-in-the-mouth, the starch content in the baked confectionery of the present invention is preferably 22 mass % or more, more preferably 25 mass % or more, more preferably 27 mass % or more, and more preferably 29 mass % or more. From a viewpoint of finishing in further favorable hardness, the starch content in the baked confectionery of the present invention is preferably 42 mass % or less, more preferably 40 mass % or less, and more preferably 38 mass % or less. When the brightness in appearance, the melt-in-the-mouth and the hardness are taken into consideration, the starch content in the baked confectionery of the present invention is more preferably from 20 to 42 mass %, more preferably from 20 to 40 mass %, more preferably from 22 to 40 mass %, more preferably from 25 to 40 mass %, and more preferably from 27 to 38 mass %.

In the present invention, the starch content can be measured according to the method described in Examples as described later.

The baked confectionery of the present invention contains no gliadin, or the content thereof is suppressed in the specific range. The gliadin is a gluten precursor, together with glutenin. When water is added to grain powder containing the gliadin and the glutenin, such as wheat flour, the gliadin and the glutenin are entangled and gluten is formed.

In production of the baked confectionery, when an ingredient derived from the seeds of the wheat variety is used as a raw material, a certain amount of gliadin may be incorporated into the baked confectionery, but the gliadin content in the baked confectionery of the present invention is 1.1 mass % or less, preferably 1.0 mass % or less, more preferably 0.95 mass % or less, more preferably 0.9 mass % or less, and more preferably 0.75 mass % or less. When the gliadin content is too high, the baked confectionery becomes hard and the food texture is deteriorated. From a viewpoint of production, the gliadin content in the baked confectionery of the present invention is preferably 0.1 mass % or more, more preferably 0.15 mass % or more, more preferably 0.2 mass % or more, more preferably 0.3 mass % or more, and more preferably 0.35 mass % or more. The gliadin content in the baked confectionery of the present invention is more specifically preferably from 0.0 to 1.1 mass %, more preferably from 0.0 to 1.0 mass %, more preferably from 0.0 to 0.95 mass %, more preferably from 0.1 to 0.9 mass %, more preferably from 0.15 to 0.75 mass %, and more preferably from 0.2 to 0.75 mass %.

In the present invention, the gliadin content can be measured according to the method described in Examples as described later.

The baked confectionery of the present invention preferably contains a saccharide. The saccharide is not particularly limited, and specific examples include one kind or two or more kinds selected from a monosaccharide, a disaccharide, a trisaccharide, a tetrasaccharide, a pentasaccharide, a hexasaccharide, a starch hydrolysate, and sugar alcohol obtained by reducing these materials. More specifically, specific examples include one kind or two or more kinds selected from glucose, maltose, fructose, sucrose, lactose, trehalose, maltotriose, maltotetraose, sorbitol, xylitol, erythritol, maltitol, starch syrup, high-fructose corn syrup, invert sugar, cyclodextrin, dextrin, and branched cyclodextrin.

From a viewpoint of flavor and storage stability of the food, a saccharide content in the baked confectionery of the present invention is preferably 0.1 mass % or more, more preferably 1 mass % or more, more preferably 2 mass % or more, and more preferably 5 mass % or more. Moreover, from a similar viewpoint, the saccharide content in the baked confectionery of the present invention is preferably 30 mass % or less, more preferably 25 mass % or less, more preferably 20 mass % or less, and more preferably 18 mass % or less. More specifically, the saccharide content in the baked confectionery of the present invention is preferably from 0.1 to 30 mass %, more preferably from 1 to 25 mass %, more preferably from 2 to 20 mass %, and more preferably from 5 to 18 mass %.

The baked confectionery of the present invention preferably contains fat and oil. The fat and oil are not particularly limited. For example, one kind or two or more kinds selected from vegetable fat and oil, animal fat and oil, emulsified fat and oil, and shortening can be used. Specific examples of the vegetable fat and oil include one kind or two or more kinds selected from soybean oil, olive oil, safflower oil, corn oil, rapeseed oil, cottonseed oil, fractionated oil thereof, transesterified oil thereof and hydrogenated oil thereof. Moreover, specific examples of the animal fat and oil include lard. Further, specific examples of the emulsified fat and oil include water-in-oil emulsified fat and oil. Specific examples of the water-in-oil emulsified fat and oil include one kind or two or more kinds selected from margarine, fat spread and butter. Moreover, when necessary, oil-in-water emulsified fat and oil may be used. Moreover, one kind or two or more kinds selected from purified or partially purified monoacylglycerol, diacylglycerol and triacylglycerol may be used.

From a viewpoint of the food texture, a fat and oil content in the baked confectionery of the present invention is preferably 0.1 mass % or more, more preferably 1 mass % or more, more preferably 5 mass % or more, and more preferably 10 mass % or more. Moreover, from a similar viewpoint, the fat and oil content is preferably 60 mass % or less, more preferably 50 mass % or less, more preferably 45 mass % or less, and more preferably 40 mass % or less. More specifically, the oil and fat content in the baked confectionery of the present invention is preferably from 0.1 to 60 mass %, more preferably from 1 to 50 mass %, more preferably from 5 to 45 mass %, and more preferably from 10 to 40 mass %.

In the baked confectionery of the present invention, a content of fat and oil having a melting point of 20° C. or lower to a content of fat and oil having a melting point of from 25 to 50° C., more specifically, [the content of fat and oil having the melting point of 20° C. or lower]/[the content of fat and oil having the melting point of from 25 to 50° C.] is preferably 0/7 or more and less than 1/7 in terms of a mass ratio. The fat and oil contained in the baked confectionery of the present invention is preferably composed of the fat and oil having a melting point of from 25 to 50° C., preferably from 25 to 45° C., and more preferably from 25 to 40° C.

The melting point of the above-described fat and oil is a boundary temperature point at which all of solid fat melt. A solid fat content in the fat and oil can be measured according to the method described in 2.2.9 Solid Fat Content (NMR method) in the Standard Methods for the Analysis of Fats, Oils and Related Materials established by Japan Oil Chemists' Society.

The baked confectionery of the present invention preferable contains an egg. The egg here means one derived from an egg to be used in preparation of the dough as described later and existing in a heated state by being baked. More specifically, the egg does not mean non-heated egg, such as a raw egg blended in the preparation of the dough. From a viewpoint of the flavor, a content of the above-described egg existing in the baked confectionery of the present invention is preferably 2 mass % or more, more preferably 3 mass % or more, more preferably 4 mass % or more, and more preferably 5 mass % or more. Moreover, from a similar viewpoint, the content of the above-described egg existing in the baked confectionery of the present invention is preferably 30 mass % or less, more preferably 25 mass % or less, and more preferably 20 mass % or less. More specifically, the content of the above-described egg existing in the baked confectionery of the present invention is preferably from 2 to 30 mass %, more preferably from 3 to 25 mass %, more preferably from 4 to 20 mass %, and more preferably from 5 to 20 mass %.

The baked confectionery of the present invention may contain milk powder. The milk powder is preferably skimmed milk powder.

From a viewpoint of the flavor, a milk powder content in the baked confectionery of the present invention is preferably 1 mass % or more, more preferably 2 mass % or more, more preferably 3 mass % or more, and more preferably 5 mass % or more. Moreover, from a similar viewpoint, the milk powder content in the baked confectionery of the present invention is preferably 20 mass % or less, more preferably 18 mass % or less, more preferably 16 mass % or less, and more preferably 15 mass % or less. More specifically, the milk powder content in the baked confectionery of the present invention is preferably from 1 to 20 mass %, more preferably from 2 to 18 mass %, more preferably 3 to 16 mass %, and more preferably from 5 to 15 mass %.

In addition to each ingredient described above, the baked confectionery of the present invention may also contain, in a remainder, other ingredients derived from the raw material that may be blended in the preparation of the dough, or other ingredients derived from various condiments to be added after the dough is baked. As origins of other ingredients described above, specific examples include one kind or two or more kinds selected from insoluble dietary fiber-containing farina, milk, coconut milk, kitchen salt, powder, a condiment, baking powder, a pH adjuster, an antioxidant, a flavoring agent and water.

From a viewpoint of the storage stability, a moisture content (water content) in the baked confectionery of the present invention is preferably 20 mass % or less, more preferably 15 mass % or less, and more preferably 10 mass % or less. Moreover, from a viewpoint of the food texture, the moisture content in the baked confectionery of the present invention is preferably 3 mass % or more, more preferably 4 mass % or more, and more preferably 5 mass % or more. More specifically, the moisture content in the baked confectionery of the present invention is preferably from 3 to 20 mass %, more preferably from 4 to 15 mass %, and more preferably from 5 to 10 mass %. Moreover, the moisture content is also preferably from 5 to 20 mass %.

From a viewpoint of the storage stability, water activity of the baked confectionery of the present invention is preferably 0.8 or less, more preferably 0.7 or less, and more preferably 0.6 or less.

Even though the baked confectionery of the present invention is rich in the insoluble dietary fiber, the baked confectionery has softer and smoother food texture and good melt-in-the-mouth. Moreover, the burnt deposit color caused by being baked is suppressed, and the baked confectionery has brighter appearance.

A method of producing the baked confectionery of the present invention is described below. The method of producing the baked confectionery of the present invention is simply referred to as "production method of the present invention."

The baked confectionery of the present invention may be obtained by baking the dough prepared by using, as the main raw materials, insoluble dietary fiber-containing powder containing bran of wheat variety as an ingredient (A), and the starch as an ingredient (B), and blending therein at least a specific amount of saccharide, and fat and oil.

The above-described insoluble dietary fiber-containing powder containing the bran of wheat variety is powder rich in the insoluble dietary fiber, and contains the insoluble dietary fiber in an amount of preferably 20 mass % or more, more preferably 30 mass % or more, and more preferably 40 mass % or more. The insoluble dietary fiber-containing powder containing the bran of wheat variety is not particularly limited, as long as the powder contains the bran of wheat variety, and may contain, in addition to the bran of wheat variety, for example, one kind or two or more kinds selected from a cellulose preparation, a crystalline cellulose preparation, a methylcellulose preparation, a hemicellulose preparation, a preparation obtained by powdering hulls of grain seeds other than the wheat variety, a soybean pulp left after squeezing soybean milk from soybean, a preparation obtained by powdering shells of crustacea, and a preparation obtained by powdering of cell walls of fungi. Specific examples of the preparation obtained by powdering the shells of crustacea include a preparation containing the chitin or the chitosan.

A ratio of the bran of wheat variety (more specifically, one kind or two or more kinds selected from the wheat, the barley, the rye and the oats) in the above-described insoluble dietary fiber-containing powder containing the bran of wheat variety is preferably 50 mass % or more, and more preferably 70 mass % or more. More specifically, the ratio of the bran of wheat variety in the insoluble dietary fiber-containing powder containing the bran of wheat variety is preferably from 50 to 100 mass %, more preferably from 70 to 100 mass %, more preferably from 80 to 100 mass %, more preferably from 90 to 100 mass %, and more preferably 100 mass %.

Moreover, the above-described bran of wheat variety in the above-described insoluble dietary fiber-containing powder containing the bran of wheat variety preferably contains one kind or two or more kinds selected from the wheat bran and the barley bran, and a ratio of one kind or two or more kinds selected from the wheat bran and the barley bran in the bran of wheat variety is preferably 50 mass % or more, and more preferably 70 mass % or more. More specifically, the ratio of one kind or two or more kinds selected from the wheat bran and the barley bran in the bran of wheat variety is preferably from 50 to 100 mass %, more preferably from 70 to 100 mass %, more preferably from 80 to 100 mass %, more preferably 90 to 100 mass %, and more preferably 100 mass %.

The insoluble dietary fiber-containing powder composed of one kind or two or more kinds selected from the above-described wheat bran and barley bran preferably contains the wheat bran, and a ratio of the wheat bran in the insoluble dietary fiber-containing powder composed of one kind or two or more kinds selected from the above-described wheat bran and barley bran is preferably 50 mass % or more, and more preferably 70 mass % or more. More specifically, the ratio is preferably from 50 to 100 mass %, more preferably from 70 to 100 mass %, more preferably from 80 to 100 mass %, more preferably from 90 to 100 mass %, and more preferably 100 mass %.

More specifically, the above-described insoluble dietary fiber-containing powder containing the bran of wheat variety is preferably the wheat bran.

The gliadin content in the above-described insoluble dietary fiber-containing powder containing the bran of wheat variety is, upon preparing the dough by blending the powder in the dough in a blending amount as described later, adjusted so that the gliadin content in the dough becomes 0.95 mass % or less. The gliadin content in the above-described insoluble dietary fiber-containing powder is preferably as small as possible.

No starch is contained in the above-described insoluble dietary fiber-containing powder.

The starch used in the production method of the present invention is not particularly limited. For example, one kind or two or more kinds exemplified as the starch that may be contained in the above-mentioned baked confectionery of the present invention can be used.

In the production method of the present invention, the amount of the insoluble dietary fiber-containing powder containing the bran of wheat variety in 100 mass parts of the total amount of the insoluble dietary fiber-containing powder containing the bran of wheat variety, and the starch blended in the dough is from 21 to 60 mass parts, and the amount of the starch is the amount of mass parts to be 100 mass parts in the total of the insoluble dietary fiber-containing powder containing the bran of wheat variety, and the starch (more specifically, from 40 to 79 mass parts). Further, the amount of the insoluble dietary fiber-containing powder containing the bran of wheat variety in 100 mass parts of the total amount of the insoluble dietary fiber-containing powder containing the bran of wheat variety, and the starch blended in the dough is from 25 to 50 mass parts, and the amount of the starch is the amount of mass parts to be 100 mass parts in the total of the insoluble dietary fiber-containing powder containing the bran of wheat variety, and the starch (more specifically, from 50 to 75 mass parts). The insoluble dietary fiber and the starch can be blended in a sufficient amount by applying such a blending ratio, resulting in exhibiting physiological effect of the insoluble dietary fiber and developing a good taste inherent to starch dough.

In the production method of the present invention, the dough is prepared by blending therein, in a specific amount, at least the above-described insoluble dietary fiber-containing powder containing the bran of wheat variety, the above-described starch, the saccharide, and the fat and oil.

The above-described saccharide is not particularly limited. For example, one exemplified as the saccharide that may be contained in the above-mentioned baked confectionery of the present invention can be used.

From viewpoints of the flavor and the storage stability of the food, the amount of the saccharide blended in the dough is from 1 to 90 mass parts, with respect to 100 mass parts of the total blending amount of insoluble dietary fiber-containing powder containing the bran of wheat variety, and the starch. The amount of the saccharide blended in the dough is preferably 3 mass parts or more, more preferably 5 mass parts or more, and more preferably 10 mass parts or more, with respect to 100 mass parts of the total blending amount of the insoluble dietary fiber-containing powder containing the bran of wheat variety, and the starch. Moreover, the amount of the saccharide blended in the dough is preferably 70 mass parts or less, more preferably 50 mass parts or less, more preferably 40 mass parts or less, and more preferably 30 mass parts or less, with respect to 100 mass parts of the total blending amount of the insoluble dietary fiber-containing powder containing the bran of wheat variety, and the starch. More specifically, the amount of the saccharide blended in the dough is preferably from 3 to 70 mass parts, more preferably from 5 to 50 mass parts, more preferably from 5 to 40 mass parts, and more preferably from 10 to 30 mass parts, with respect to 100 mass parts of the total blending amount of the insoluble dietary fiber-containing powder containing the bran of wheat variety, and the starch.

The above-described fat and oil are not particularly limited. For example, one kind or two or more kinds exemplified as the fat and oil that may be contained in the above-mentioned baked confectionery of the present invention can be used.

From a viewpoint of the food texture, the amount of the fat and oil blended in the dough is from 1 to 150 mass parts, with respect to 100 mass parts of the total blending amount of the insoluble dietary fiber-containing powder containing the bran of wheat variety, and the starch. Further, the amount of the fat and oil blended in the dough is preferably 3 mass parts or more, more preferably 5 mass parts or more, more preferably 10 mass parts or more, more preferably 20 mass parts or more, more preferably 30 mass parts or more, and more preferably 40 mass parts or more, with respect to 100 mass parts of the total blending amount of the insoluble dietary fiber-containing powder containing the bran of wheat variety, and the starch. Moreover, the amount of the fat and oil blended in the dough is preferably 110 mass parts or less, more preferably 80 mass parts or less, more preferably 70 mass parts or less, and more preferably 68 mass parts or less, with respect to 100 mass parts of the total blending amount of the insoluble dietary fiber-containing powder containing the bran of wheat variety, and the starch. More specifically, the amount of the fat and oil blended in the dough is preferably from 3 to 110 mass parts, more preferably from 5 to 80 mass parts, more preferably from 5 to 70 mass parts, more preferably from 10 to 70 mass parts, more preferably from 20 to 70 mass parts, more preferably from 30 to 70 mass parts, and more preferably from 40 to 68 mass parts, with respect to 100 mass parts of the total blending amount of the insoluble dietary fiber-containing powder containing the bran of wheat variety, and the starch.

In blending the fat and oil in the dough, the blending amount of the fat and oil having the melting point of 20° C. or lower to the blending amount of the fat and oil having the melting point of from 25 to 50° C., more specifically, [blending amount of the fat and oil having the melting point of 20° C. or lower]/[blending amount of the fat and oil having the melting point of from 25 to 50° C.] is preferably 0/7 or more and less than 1/7 in terms of the mass ratio. The fat and oil contained in the baked confectionery of the present invention is preferably composed of the fat and oil having the melting point of from 25 to 50° C., more preferably composed of the fat and oil having the melting point of from 25 to 45° C., and more preferably composed of the fat and oil having the melting point of from 25 to 40° C. The method of measuring the above-described melting point is as described in the description of the baked confectionery of the present invention.

In the production method of the present invention, the egg is preferably blended in the dough. The egg is not particularly limited, and a hen's egg, an ostrich's egg, a duck's egg or the like can be used, and above all, a hen's egg is preferably used. The above-described egg means egg white or egg yolk, or egg white and egg yolk.

A form of processing the egg to be used is not particularly limited. For example, one kind or two or more kinds selected from a raw egg, a frozen egg, a powdered egg, a sugar-added egg, and a pasteurized egg can be used, and above all, a pasteurized egg is preferably used.

From a viewpoint of the flavor, an amount of the egg blended in the dough is preferably 10 mass parts or more, more preferably 12 mass parts or more, and more preferably 15 mass parts or more, with respect to 100 mass parts of the total blending amount of the insoluble dietary fiber-containing powder containing the bran of wheat variety, and the starch. Moreover, from a similar viewpoint, the amount of the egg blended in the dough is preferably 80 mass parts or less, more preferably 60 mass parts or less, more preferably 50 mass parts or less, more preferably 40 mass parts or less, and more preferably 35 mass parts or less, with respect to 100 mass parts of the total blending amount of the insoluble dietary fiber-containing powder containing the bran of wheat variety, and the starch. More specifically, the amount of the egg blended in the dough is preferably from 10 to 80 mass parts, more preferably from 12 to 60 mass parts, more preferably from 15 to 50 mass parts, more preferably from 15 to 40 mass parts, and more preferably from 15 to 35 mass parts, with respect to 100 mass parts of the total blending amount of the insoluble dietary fiber-containing powder containing the bran of wheat variety, and the starch.

In the production method of the present invention, the milk powder can be mixed in the dough. The milk powder is preferably the skimmed milk powder. From a viewpoint of the flavor, the amount of the milk powder blended in the dough is preferably 10 mass parts or more, more preferably 15 mass parts or more, and more preferably 20 mass parts or more, with respect to 100 mass parts of the total blending amount of the insoluble dietary fiber-containing powder containing the bran of wheat variety, and the starch. Moreover, from a similar viewpoint, the amount of the milk powder blended in the dough is preferably 60 mass parts or less, more preferably 50 mass parts or less, and more preferably 40 mass parts or less, with respect to 100 mass parts of the total blending amount of the insoluble dietary fiber-containing powder containing the bran of wheat variety, and the starch. More specifically, the amount of the milk powder blended in the dough is preferably from 10 to 60 mass parts, more preferably from 15 to 50 mass parts, and more preferably from 20 to 40 mass parts, with respect to 100 mass parts of the total blending amount of the insoluble dietary fiber-containing powder containing the bran of wheat variety, and the starch.

In the production method of the present invention, for example, one kind or two or more kinds selected from the milk, the coconut milk, maple syrup, almond powder, various condiments, various sweeteners, the baking powder, the pH adjuster, the antioxidant, the flavoring agent and water may be blended in the dough. The blending amounts of these materials are preferably within the ranges of the blending amounts in ordinary preparation of the baked confectionery.

In the above-described preparation of the dough, an ordinary method such as a sugar batter method and a flour batter method can be employed. Moreover, such a method can also be employed as hard biscuit cutting, soft biscuit cutting (embossing), biscuit rotary cutting, biscuit wire cutting, biscuit route press, biscuit depositing (drops) and hand-made biscuit.

In the production method of the present invention, a content of the insoluble dietary fiber in the prepared dough is from 4.5 to 17.0 mass %. From a viewpoint of the physiological effect of the insoluble dietary fiber, the content of the insoluble dietary fiber in the dough is preferably 4.6 mass % or more, more preferably 4.8 mass % or more, more preferably 5.0 mass % or more, more preferably 5.2 mass % or more, more preferably 5.3 mass % or more, and more preferably 5.5 mass % or more. Moreover, from a viewpoint of the food texture, the content of the insoluble dietary fiber in the above-described dough is preferably 16.0 mass % or less, more preferably 15.0 mass % or less, more preferably 14.0 mass % or less, more preferably 13.0 mass % or less, and more preferably 12.0 mass % or less, and further may be 10.0 mass % or less, 9.0 mass % or less, 8.0 mass % or less, or 7.0 mass % or less. When both sides of the physiological effect and the food texture are taken into consideration, the content of the insoluble dietary fiber in the above-described dough is preferably from 4.5 to 16.0 mass %, more preferably from 4.5 to 15.0 mass %, more preferably from 4.6 to 15.0 mass %, more preferably from 4.8 to 15.0 mass %, more preferably from 5.0 to 14.0 mass %, more preferably from 5.2 to 14.0 mass %, more preferably from 5.3 to 13.0 mass % or more, and more preferably from 5.5 to 12.0 mass %.

In the production method of the present invention, a starch content in the prepared dough is from 15 to 40 mass %. From viewpoints of the brightness in appearance and the melt-in-the-mouth, the starch content in the dough is preferably 17 mass % or more, more preferably 20 mass % or more, more preferably 23 mass % or more, and more preferably 25 mass % or more. Moreover, from a viewpoint of finishing in further favorable hardness, the starch content in the above-described dough is preferably 37 mass % or less, more preferably 35 mass % or less, and more preferably 32 mass % or less. When the brightness in appearance, the melt-in-the-mouth and the hardness are taken into consideration, the starch content in the above-described dough is preferably from 15 to 37 mass %, more preferably from 17 to 35 mass %, more preferably from 20 to 35 mass %, more preferably from 23 to 35 mass %, and more preferably from 25 to 32 mass %.

In the production method of the present invention, a gliadin content in the prepared dough is 0.95 mass % or less, preferably 0.9 mass % or less, more preferably 0.8 mass % or less, more preferably 0.75 mass % or less, and more preferably 0.7 mass % or less. When the gliadin content is too high, the baked confectionery after being baked becomes hard and the food texture is deteriorated. Moreover, the burnt deposit color by being baked is easily developed to produce a baked confectionery having dark appearance. From a viewpoint of the production, the gliadin content in the above-described prepared dough is preferably 0.05 mass % or more, more preferably 0.1 mass % or more, more preferably 0.15 mass % or more, more preferably 0.2 mass % or more, and more preferably 0.3 mass % or more. From viewpoints of the hardness, the food texture, the appearance and the production, the gliadin content in the above-described prepared dough is more specifically preferably from 0.0 to 0.95 mass %, more preferably from 0.0 to 0.9 mass %, more preferably from 0.05 to 0.8 mass %, more preferably from 0.05 to 0.75 mass %, and more preferably from 0.1 to 0.7 mass %. Moreover, the gliadin content in the above-described prepared dough may be from 0.15 to 0.7 mass %, 0.2 to 0.7 mass %, or 0.3 to 0.7 mass %.

The production method of the present invention includes baking the dough prepared as described above. The baked confectionery of the present invention may be obtained by baking the dough. Baking conditions are not particularly limited, and can be appropriately determined according to kinds of baked confectionery.

Under ordinary baking conditions, from 50 to 90 mass % of the moisture contained in the dough is lost. Accordingly, a content of a non-volatile ingredient contained in the above-described raw materials blended in the dough increases according to a lost moisture content in the baked confectionery after being baked.

With regard to the above-mentioned embodiment, the present invention discloses the baked confectionery or the method of producing the baked confectionery below.

<1>

Baked confectionery containing insoluble dietary fiber in an amount of from 5.0 to 20.0 mass % and starch in an amount of from 20.0 to 45.0 mass %, wherein a content of gliadin in the baked confectionery is 1.1 mass % or less, and the insoluble dietary fiber contains insoluble dietary fiber derived from bran of wheat variety.

<2>

The baked confectionery according to the item <1>, wherein insoluble dietary fiber other than the insoluble dietary fiber derived from the bran of wheat variety is, when the insoluble dietary fiber contains the insoluble dietary fiber other than the insoluble dietary fiber derived from the bran of wheat variety, preferably derived from one kind or two or more kinds selected from cereal other than wheat variety, legumes, fruits, green goods, shells of crustacea, and cell walls of fungi.

<3>

The baked confectionery according to the item <1> or <2>, wherein a content of the insoluble dietary fiber is preferably 5.5 mass % or more, more preferably 6.0 mass % or more, more preferably 7.0 mass % or more, more preferably 8.0 mass % or more, more preferably 9.0 mass % or more, and more preferably 10.0 mass % or more.

<4>

The baked confectionery according to any one of the items <1> to <3>, wherein a content of the insoluble dietary fiber is preferably 18.0 mass % or less, more preferably 16.0 mass % or less, more preferably 15.0 mass % or less, more preferably 14.0 mass % or less, and more preferably 13.0 mass % or less.

<5>

The baked confectionery according to the item <1> or <2>, wherein a content of the insoluble dietary fiber is preferably from 5.5 to 18.0 mass %, more preferably from 6.0 to 16.0 mass %, more preferably from 6.0 to 15.0 mass %, more preferably from 6.0 to 14.0 mass %, and more preferably from 6.0 to 13.0 mass %.

<6>

The baked confectionery according to the item <1> or <2>, wherein a content of the insoluble dietary fiber is preferably from 5.0 to 11.0 mass %, more preferably from 5.0 to 10.0 mass %, more preferably from 5.5 to 9.0 mass %, and more preferably from 5.5 to 8.0 mass %.

<7>

The baked confectionery according to any one of the items <1> to <6>, wherein the starch preferably contains one kind or two or more kinds selected from wheat starch, barley starch, rye starch, oats starch, corn starch, rice starch, legumes starch, potato starch, sweet potato starch, tapioca starch, water chestnut starch, chestnut starch, sago starch, yam starch, lotus root starch, arrowhead starch, bracken starch, lily bulb starch and amylomaize starch, and more preferably contains one kind or two or more kinds selected from the wheat starch and the corn starch.

<8>

The baked confectionery according to any one of the items <1> to <7>, wherein a starch content is preferably 22 mass % or more, more preferably 25 mass % or more, more preferably 27 mass % or more, and more preferably 29 mass % or more.

<9>

The baked confectionery according to any one of the items <1> to <8>, wherein a starch content is preferably 42 mass % or less, more preferably 40 mass % or less, and more preferably 38 mass % or less.

<10>

The baked confectionery according to any one of the items <1> to <7>, wherein a starch content is preferably from 20 to 42 mass %, more preferably from 20 to 40 mass %, more preferably from 22 to 40 mass %, more preferably from 25 to 40 mass %, and more preferably from 27 to 38 mass %.

<11>

The baked confectionery according to any one of the items <1> to <10>, wherein a gliadin content is preferably 1.0 mass % or less, more preferably 0.95 mass % or less, more preferably 0.9 mass % or less, and more preferably 0.75 mass % or less.

<12>

The baked confectionery according to any one of the items <1> to <11>, wherein a gliadin content is preferably 0.1 mass % or more, more preferably 0.15 mass % or more, more preferably 0.2 mass % or more, more preferably 0.3 mass % or more, and more preferably 0.35 mass % or more.

<13>

The baked confectionery according to any one of the items <1> to <10>, wherein a gliadin content is preferably from 0.0 to 1.1 mass %, more preferably 0.0 to 1.0 mass %, more preferably 0.0 to 0.95 mass %, more preferably 0.1 to 0.9 mass %, more preferably 0.15 to 0.75 mass %, more preferably 0.2 to 0.75 mass %, more preferably 0.3 to 0.75 mass %, and more preferably 0.35 to 0.75 mass %.

<14>

The baked confectionery according to any one of the items <1> to <13>, wherein a ratio of the insoluble dietary fiber derived from the bran of wheat variety in the insoluble dietary fiber is preferably 20 mass % or more, more specifically from 20 to 100 mass %, more preferably from 40 to 100 mass %, more preferably from 60 to 100 mass %, and more preferably 100 mass %.

<15>

The baked confectionery according to the item <14>, wherein a ratio of insoluble dietary fiber derived from one kind or two or more kinds selected from wheat bran and barley bran in the insoluble dietary fiber derived from the bran of wheat variety is preferably 50 mass % or more, more preferably 70 mass % or more, more specifically from 50 to 100 mass %, more preferably 70 to 100 mass %, more preferably 80 to 100 mass %, more preferably 90 to 100 mass %, and more preferably 100 mass %.

<16>

The baked confectionery according to the item <15>, wherein a ratio of insoluble dietary fiber derived from the wheat bran in the insoluble dietary fiber derived from one kind or two or more kinds selected from the wheat bran and the barley bran is preferably 50 mass % or more, more preferably 70 mass % or more, more specifically from 50 to 100 mass %, more preferably from 70 to 100 mass %, more preferably from 80 to 100 mass %, more preferably from 90 to 100 mass %, and more preferably 100 mass %.

<17>

The baked confectionery according to any one of the items <1> to <16>, containing fat and oil in an amount of preferably from 0.1 to 60 mass %, more preferably from 1 to 50 mass %, more preferably from 5 to 45 mass %, and more preferably from 10 to 40 mass %.

<18>

The baked confectionery according to the item <17>, wherein [content of fat and oil having a melting point of 20° C. or lower]/[content of fat and oil having a melting point of from 25 to 50° C.] is preferably 0/7 or more and less than 1/7 in terms of a mass ratio.

<19>

The baked confectionery according to the item <17>, wherein the fat and oil contains fat and oil having a melting point of preferably 25 to 50° C., more preferably from 25 to 45° C., and more preferably from 25 to 40° C.

<20>

The baked confectionery according to any one of the items <1> to <19>, containing a saccharide in an amount of preferably from 0.1 to 30 mass %, more preferably from 1 to 25 mass %, more preferably from 2 to 20 mass %, and more preferably from 5 to 18 mass %.

<21>

The baked confectionery according to any one of the items <1> to <20>, containing an egg in an amount of preferably from 2 to 30 mass %, more preferably from 3 to 25 mass %, more preferably from 4 to 20 mass %, and more preferably from 5 to 20 mass %.

<22>

The baked confectionery according to any one of the items <1> to <21>, containing milk powder in an amount of preferably from 1 to 20 mass %, more preferably from 2 to 18 mass %, more preferably from 3 to 16 mass %, and more preferably from 5 to 15 mass %.

<23>

The baked confectionery according to any one of the items <1> to <22>, wherein a moisture content is preferably 20 mass % or less, more preferably 15 mass % or less, and more preferably 10 mass % or less.

<24>

The baked confectionery according to any one of the items <1> to <23>, wherein a moisture content is preferably 3 mass % or more, more preferably 4 mass % or more, and more preferably 5 mass % or more.

<25>

The baked confectionery according to any one of the items <1> to <22>, wherein a moisture content is preferably from 3 to 20 mass %, more preferably from 4 to 15 mass %, and more preferably from 5 to 10 mass %.

<26>

The baked confectionery according to any one of the items <1> to <25>, wherein water activity is preferably 0.8 or less, more preferably 0.7 or less, and more preferably 0.6 or less.

<27>

A method of producing baked confectionery, the method including blending at least from 1 to 90 mass parts of saccharide and 1 to 150 mass parts of fat and oil, with 100 mass parts of a total amount of ingredient (A) and ingredient (B) shown below, to thereby prepare dough containing insoluble dietary fiber in an amount of from 4.5 to 17.0 mass %, starch in an amount of from 15 to 40 mass % and gliadin in an amount of 0.95 mass % or less, and baking the dough:

(A) from 21 to 60 mass parts of insoluble dietary fiber-containing powder containing bran of wheat variety; and (B) starch in an amount of mass parts to be 100 mass parts in a total including the (A).

<28>

The production method according to the item <27>, wherein the ingredient (A) contains the insoluble dietary fiber in an amount of preferably 20 mass % or more, more preferably 30 mass % or more, and more preferably 40 mass % or more.

<29>

The production method according to the item <28>, wherein a content of the insoluble dietary fiber in the ingredient (A) is 100 mass % or less.

<30>

The production method according to any one of the items <27> to <29>, wherein the ingredient (A) preferably contains ingredient other than the bran of wheat variety, and the ingredient other than the bran of wheat variety preferably contains one kind or two or more kinds selected from a cellulose preparation, a crystalline cellulose preparation, a methylcellulose preparation, a hemicellulose preparation, a preparation obtained by powdering hulls of grain seeds other than the wheat variety, soybean pulp left after squeezing soybean milk from a soybean, a preparation obtained by powdering shells of crustacea and a preparation obtained by powdering cell walls of fungi.

<31>

The production method according to any one of the items <27> to <30>, wherein the ingredient (A) contains the bran of wheat variety in an amount of preferably 50 mass % or more, more preferably 70 mass % or more, more specifically from 50 to 100 mass %, more preferably from 70 to 100 mass %, more preferably from 80 to 100 mass %, more preferably from 90 to 100 mass %, and more preferably 100 mass %.

<32>

The production method according to the item <31>, wherein a ratio of one kind or two or more kinds selected from wheat bran and barley bran in the bran of wheat variety is preferably 50 mass % or more, more preferably 70 mass % or more, more specifically from 50 to 100 mass %, more preferably from 70 to 100 mass %, more preferably from 80 to 100 mass %, more preferably from 90 to 100 mass %, and more preferably 100 mass %.

<33>

The production method according to the item <32>, wherein a ratio of the wheat bran in the insoluble dietary fiber-containing powder containing one kind or two or more kinds selected from the wheat bran and the barley bran is preferably 50 mass % or more, more preferably 70 mass % or more, more specifically from 50 to 100 mass %, more preferably from 70 to 100 mass %, more preferably from 80 to 100 mass %, more preferably from 90 to 100 mass %, and more preferably 100 mass %.

<34>

The production method according to any one of the items <27> to <33>, wherein the ingredient (B) preferably contains one kind or two or more kinds selected from wheat starch, barley starch, rye starch, oats starch, corn starch, rice starch, legumes starch, potato starch, sweet potato starch, tapioca starch, water chestnut starch, chestnut starch, sago starch, yam starch, lotus root starch, arrowhead starch, bracken starch, lily bulb starch and amylomaize starch, and more preferably contains one kind or two or more kinds selected from the wheat starch and the corn starch.

<35>

The production method according to any one of the items <27> to <34>, wherein the amount of the insoluble dietary fiber-containing powder containing the bran of wheat variety is preferably from 25 to 50 mass parts, and the amount of the starch is preferably from 50 to 75 mass parts in 100 mass parts of the total amount of the insoluble dietary fiber-containing powder containing the bran of wheat variety, and the starch blended in dough.

<36>

The production method according to any one of the items <27> to <35>, wherein a content of the insoluble dietary fiber in the dough is preferably 4.6 mass % or more, more preferably 4.8 mass % or more, more preferably 5.0 mass % or more, more preferably 5.2 mass % or more, more preferably 5.3 mass % or more, and more preferably 5.5 mass % or more.

<37>

The production method according to any one of the items <27> to <36>, wherein a content of the insoluble dietary fiber in the dough is preferably 16.0 mass % or less, more preferably 15.0 mass % or less, more preferably 14.0 mass % or less, more preferably 13.0 mass % or less, and more preferably 12.0 mass % or less.

<38>

The production method according to any one of the items <27> to <35>, wherein a content of the insoluble dietary fiber in the dough is preferably from 4.5 to 16.0 mass %, more preferably from 4.6 to 15.0 mass %, more preferably from 4.8 to 14.0 mass %, more preferably from 5.0 to 14.0 mass %, more preferably from 5.2 to 14.0 mass %, more preferably from 5.3 to 13.0 mass %, more preferably from 5.5 to 12.0 mass %, and more preferably from 5.5 to 10.0 mass %.

<39>

The production method according to any one of the items <27> to <35>, wherein a content of the insoluble dietary fiber in the dough is preferably from 4.5 to 10.0 mass %, more preferably from 4.5 to 9.0 mass %, and more preferably from 4.6 to 8.0 mass %.

<40>

The production method according to any one of the items <27> to <39>, wherein a starch content in the dough is preferably 17 mass % or more, more preferably 20 mass % or more, more preferably 23 mass % or more, and more preferably 25 mass % or more.

<41>

The production method according to any one of the items <27> to <40>, wherein a starch content in the dough is preferably 37 mass % or less, more preferably 35 mass % or less, and more preferably 32 mass % or less.

<42>

The production method according to any one of the items <27> to <39>, wherein a starch content in the dough is preferably from 15 to 37 mass %, more preferably from 17 to 35 mass %, more preferably from 20 to 35 mass %, more preferably from 23 to 35 mass %, and more preferably from 25 to 32 mass %.
<43>
The production method according to any one of the items <27> to <42>, wherein a gliadin content in the dough is preferably 0.9 mass % or less, more preferably 0.8 mass % or less, more preferably 0.75 mass % or less, and more preferably 0.7 mass % or less.
<44>
The production method according to any one of the items <27> to <43>, wherein a gliadin content in the dough is preferably 0.05 mass % or more, more preferably 0.1 mass % or more, more preferably 0.15 mass % or more, more preferably 0.2 mass % or more, and more preferably 0.3 mass % or more.
<45>
The production method according to any one of the items <27> to <42>, wherein a gliadin content in the dough is preferably from 0.0 to 0.95 mass %, more preferably from 0.0 to 0.9 mass %, more preferably from 0.05 to 0.8 mass %, more preferably from 0.05 to 0.75 mass %, more preferably from 0.1 to 0.7 mass %, more preferably from 0.15 to 0.7 mass %, more preferably from 0.2 to 0.7 mass %, and more preferably from 0.3 to 0.7 mass %.
<46>
The production method according to any one of the items <27> to <45>, wherein an amount of fat and oil blended in the dough is preferably from 3 to 110 mass parts, more preferably from 5 to 80 mass parts, more preferably from 5 to 70 mass parts, more preferably from 10 to 70 mass parts, more preferably from 20 to 70 mass parts, more preferably from 30 to 70 mass parts, and more preferably from 40 to 68 mass parts, with respect to 100 mass parts of the total blending amount of the insoluble dietary fiber-containing powder containing the bran of wheat variety, and the starch.
<47>
The production method according to any one of the items <27> to <46>, wherein [blending amount of fat and oil having a melting point of 20° C. or lower]/[blending amount of fat and oil having a melting point of from 25 to 50° C.] is 0/7 or more and less than 1/7 in terms of a mass ratio.
<48>
The baked confectionery according to any one of the items <27> to <46>, wherein fat and oil blended in the dough is fat and oil having a melting point of preferably from 25 to 50° C., more preferably from 25 to 45° C., and more preferably from 25 to 40° C.
<49>
The production method according to any one of the items <27> to <48>, wherein an amount of the saccharide blended in the dough is preferably from 3 to 70 mass parts, more preferably from 5 to 50 mass parts, more preferably from 5 to 40 mass parts, and more preferably from 10 to 30 mass parts, with respect to 100 mass parts of the total blending amount of the insoluble dietary fiber-containing powder containing the bran of wheat variety, and the starch.
<50>
The production method according to any one of the items <27> to <49>, wherein an egg is preferably blended in preparation of the dough.
<51>
The production method according to the item <50>, wherein an amount of the egg blended in the dough is preferably from 10 to 80 mass parts, more preferably from 12 to 60 mass parts, more preferably from 15 to 50 mass parts, more preferably from 15 to 40 mass parts, and more preferably from 15 to 35 mass parts, with respect to 100 mass parts of the total blending amount of the insoluble dietary fiber-containing powder containing the bran of wheat variety, and the starch.
<52>
The production method according to any one of the items <27> to <51>, wherein milk powder is preferably blended in preparation of the dough.
<53>
The production method according to the item <52>, wherein an amount of the milk powder blended in the dough is preferably from 10 to 60 mass parts, more preferably from 15 to 50 mass parts, and more preferably from 20 to 40 mass parts, with respect to 100 mass parts of the total blending amount of the insoluble dietary fiber-containing powder containing the bran of wheat variety, and the starch.
<54>
Baked confectionery obtainable by the method according to any one of the items <27> to <53>.

EXAMPLES

The present invention will be described in more detail based on the following examples, but the invention is not intended to be limited thereto.
[Measurement of Insoluble Dietary Fiber]
An amount of insoluble dietary fiber was measured by the modified Prosky method described in AOAC Method 991.42. Specifically the amount was measured by the following method.

A sample was processed using a homogenizer, and then sieved using a 10-mesh sieve to obtain powder having a particle size of 2 mm or less. Then, 125 mL of petroleum ether was added to 5 g of the powder sample, and the resultant mixture was allowed to stand for 15 minutes while the mixture was occasionally stirred, and then centrifuged (2150 G, 10 minutes), and a supernatant was poured into a glass filter G-3. Further, the same operation was repeated twice, and finally a total amount was poured into the glass filter, a residue was air-dried, and then the resultant defatted sample was weighed. Then, 1 g of the defatted sample was collected into to a 500 mL-volume tall beaker, 50 mL of 0.08 M phosphate buffer solution having pH 6.0, and 0.1 mL of thermostable α-amylase sold by NovoZymes NS under a trade name: Termacyl 120 L were added thereto. The resultant slurry was allowed to stand in a water bath at 95° C. for 30 minutes while the slurry was shaken at an interval of 5 minutes, and allowed to cool for 10 minutes at room temperature, and then 0.275 M sodium hydroxide solution was added thereto and adjusted to pH 7.5. Then, 0.1 mL of protease (manufactured by Sigma-Aldrich Corporation) 50 mg/mL dissolved into 0.08 M phosphate buffer solution adjusted to pH 6.0 was added thereto. Activity of the added protease was 500 U/mL. Then, the resultant mixture was shaken at 60° C. for 30 minutes, allowed to cool at room temperature for 10 minutes, and then adjusted to pH 4.3 using 0.325 M hydrochloric acid. Then, 0.1 mL of amyloglucosidase sold under a trade name: Amyloglucosidase solution from *Aspergillus niger* from Sigma-Aldrich Corporation was added thereto, and the resultant mixture was shaken at 60° C. for 30 minutes. Filtration was made using a crucible type glass 2G2, a product obtained by drying a residue at 105° C. overnight was weighed, and taken as an amount of insoluble dietary fiber. A content of the insoluble dietary fiber in baked confectionery was calculated based on this amount of insoluble dietary fiber.

[Measurement of Starch]

With regard to measurement of starch, after de-sugar treatment was applied, the measurement was carried out according to AOAC method 996.11. Specifically, the starch was measured by the following method.

A sample was milled, and then sieved using 50-mesh sieve to obtain powder having a particle size of 0.5 mm or less. In the sample, 100 mg was taken to a glass tube, and 0.2 mL of 80% ethanol was added thereto, and the resultant mixture was stirred. Thereto, 3 mL of solution obtained by dissolving thermostable α-amylase sold under a trade name: Thermostable α-amylase from Megazyme International Ireland into 50 mM of MOPS buffer having pH 7.0 was added. The α-amylase activity of the added solution was 3,000 U/mL. Then, the resultant mixture was allowed to stand in boiling water for 6 minutes. On the occasion, the resultant mixture was vigorously stirred after elapse of 2 minutes, 4 minutes and 6 minutes. Further, 4 mL of 200 mM acetic acid buffer having pH 4.5 was added thereto and 0.1 mL of amyloglucosidase sold under a trade name: Amyloglucosidase from Megazyme International Ireland was added thereto. The activity of the added amyloglucosidase was 3,300 U/mL. Then, the resultant mixture was allowed to stand at 50° C. for 30 minutes, adjusted to a volume of 100 mL using a measuring flask, and centrifuged at 3,000 rpm for 10 minutes. The resultant supernatant was filtered, and to 0.1 mL of this filtrate, 3.0 mL of GOPOD solution manufactured by Megazyme International Ireland was added, and the resultant mixture was incubated at 50° C. for 20 minutes, and then absorbance at 510 nm: ΔA was measured. A content of starch in baked confectionery was calculated from a starch amount obtained based on the following formula. The absorbance of 100 μg of glucose is expressed by absorbance at 510 nm after 3.0 mL of GOPOD solution manufactured by Megazyme International Ireland was added to 100 μg of glucose, and the resultant mixture was incubated at 50° C. for 20 minutes.

$$\text{Starch amount (μg)}=\Delta A \times F \times 0.9$$

F=100/[absorbance of 100 μg of glucose at 510 nm]

[Measurement of Gliadin]

A gliadin amount was measured using a Morinaga FASPEK milk measurement kit (gliadin) by the following method.

A sample was milled using a mixer, and homogenized. Then, 1 g of homogenized sample was taken to a 50 mL-volume centrifuging tube made of polypropylene, 19 mL of specimen extraction liquid attached to the measurement kit was added thereto, and the resultant mixture was well shaken and mixed, and then shaken at 90 to 110 double strokes/min, room temperature, and a shaking width of about 3 cm for 12 hours or more. An extract was adjusted to the vicinity of neutrality of pH 6.0 to 8.0, centrifuged at 3,000 rpm at room temperature for 20 minutes to fractionate a supernatant. This supernatant was diluted 20 times using a specimen diluent I attached to the measurement kit, and further, diluted 160,000 times to 3,200,000 times using a specimen diluent II, and a diluent in which a gliadin concentration fell within a calibration curve was taken as a solution for measurement. The calibration curve was prepared in the range of from 0.23 ng/mL to 15.0 ng/mL in the gliadin concentration prepared by using gliadin, from wheat (SIGMA).

An antibody coated plate attached to the measurement kit was returned to room temperature, and the solution for measurement was added to each well by 100 μL, and then a lid was placed thereon and left to stand at room temperature for 1 hour. A solution in the well was completely removed, and the well was cleaned 6 times using a cleaning solution by 300 μL for each well. An enzyme-labeled anti-gliadin antibody solution attached to the measurement kit was dispensed by 100 μL for each well. A lid was placed thereon and the well was left to stand at room temperature for 30 minutes, and then a solution in the well was completely removed. The well was cleaned 6 times using a cleaning solution by 300 μL for each well, and an enzyme substrate solution attached to the measurement kit was dispensed by 100 μL for each well. A lid was placed thereon and left to stand at room temperature for 10 minutes under shading, a reaction stopper attached to the measurement kit was dispensed by 100 μL for each well. Absorbance was measured under conditions of dominant wavelength of 450 nm, complementary wavelength of 595 nm using a plate reader to determine the gliadin concentration in the sample based on a standard curve prepared from simultaneously measured absorbance of a standard solution.

Production Example

Production of Baked Confectionery

Each raw material was blended according to blending amounts described in Table 1 below to prepare dough, and the dough was baked to produce baked confectionery of Reference Product, Present Inventions 1 to 7 and Comparative Products 1 to 9. A specific production method is described in detail below.

Butter sold under a trade name: Yotsuba butter (unsalted) from Yotsuba Milk Products Co., Ltd., margarine sold under a trade name: Cherica Gold E(A) from Kao Corporation, sugar sold under a trade name of Refined Superfine Sugar from Dai-Nippon Meiji Sugar Co., Ltd., skimmed milk powder manufactured by National Federation of Dairy Cooperative Associations, and kitchen salt manufactured by The Salt Industry Center of Japan were weighed and put in HOBART mixer N50 MIXER manufactured by HOBART GmbH, and the resultant mixture was mixed at a low speed for 30 seconds, and then mixed at a medium speed to predetermined specific gravity of 0.90 or less.

Further, while the resultant mixture was stirred at a low speed for 30 seconds, one obtained by beating a whole egg of a hen's egg was divided into three and added thereto. After a first portion of egg was added thereto, the resultant mixture was stirred at a low speed for 30 seconds, and subsequently, a second portion of egg was added thereto, and the resultant mixture was stirred at a low speed for 30 seconds. After oil adhered to a wall of the mixer was scraped off, an egg was added thereto, and the resultant mixture was stirred at a low speed for 30 seconds, and further stirred at a medium speed for 1 minute until a uniform cream state was formed.

Subsequently, wheat starch HS-425 manufactured by Chiba Flour Milling Co., Ltd., corn starch sold under a trade name of Cornstarch from Nihon Shokuhin Kako Co., Ltd., tapioca starch manufactured by native tapioca starch, National Starch & Chemical Company, weak flour manufactured by Nisshin Flour Milling Inc., wheat bran sold under a trade name of Wheat Bran DF from Nisshin Pharma Inc., barley bran manufactured by Fieldgaines Co., Ltd., cellulose sold under a trade name of NP Fiber W-10MG2 from Nippon Paper Chemicals Co., Ltd., whole wheat flour manufactured by Nisshin Flour Milling Inc., and gluten manufactured by Glico Nutrition Co., Ltd. were mixed at blending amounts described in Table 1 below, and the resultant mixture was stirred at a low speed for 45 seconds.

Then, 18 g of dough obtained as described above was packed into a rectangular baking pan to line the pan on a top plate on which a release paper was placed, and six holes were punctured on a surface using a bamboo skewer. As the baking pan, a pan made of metal and having a dimension of vertical×horizontal×height: 70 mm×20 mm×15 mm was used.

Subsequently, baking was performed under the following baking conditions.

Baking temperature: upper flame 150° C./lower flame 150° C.

Baking time: 50 minutes

A moisture content in the baked confectionery after being baked was in the range of from 4 to 7 mass % for all.

The following test was conducted using a baked confectionery after elapse of one day from baking. Table 1 describes Comparative Product 7 having a blending composition in which the starch content is larger than the content defined in the present invention, and Comparative Product 8 having a blending composition in which the starch content is smaller than the content defined in the present invention. However, in the blending composition of Comparative Product 7, even when preparation of dough was tried, the materials resulted in crumbling to allow no preparation of the dough. Moreover, in the blending composition of Comparative Product 8, even when preparation of dough was tried, the materials caused too strong stickiness to allow no preparation of dough, either.

Test Example 1

With regard to the baked confectionery produced in the above-described Production Examples, brightness in appearance, and hardness and melt-in-the-mouth when the confectionery was eaten were evaluated by a relative evaluation applying evaluation criteria based on a reference product prepared using whole wheat flour as farina. An evaluation numerical value was determined upon consultation of three specialist panels.

The results are shown in Table 1 below.

—Evaluation Criteria of Brightness in Appearance—

10: Thinnest burnt deposit color, and very bright in appearance in comparison with the reference product.
9: Significantly thinner burnt deposit color, and significantly brighter in appearance in comparison with the reference product.
8: Relatively thinner burnt deposit color, and relatively brighter in appearance in comparison with the reference product.
7: A little thinner burnt deposit color, and a little brighter in appearance in comparison with the reference product.
6: Slightly thinner burnt deposit color, and slightly brighter in appearance in comparison with the reference product.
5: Burnt deposit color and brightness in a degree equivalent to the degree of the reference product.
4: Slightly thicker burnt deposit color and slightly darker in appearance in comparison with the reference product.
3: A little thicker burnt deposit color and a little darker in appearance in comparison with the reference product.
2: Significantly thicker burnt deposit color and significantly darker in appearance in comparison with the reference product.
1: Thickest burnt deposit color and very dark in appearance in comparison with the reference product 1.

—Evaluation Criteria of Hardness—

10: Softest, i.e., very soft in food texture in comparison with the reference product.
9: Significantly softer, i.e., significantly softer in food texture in comparison with the reference product.
8: Relatively softer, i.e., relatively softer in food texture in comparison with the reference product.
7: A little softer, i.e., a little softer in food texture in comparison with the reference product.
6: Slightly softer, i.e., slightly softer in food texture in comparison with the reference product.
5: Hardness equivalent to the hardness of the reference product.
4: Slightly harder in food texture in comparison with the reference product.
3: A little harder in food texture in comparison with the reference product.
2: Significantly harder in food texture in comparison with the reference product.
1: Very hard in food texture in comparison with the reference product.

—Evaluation Criteria of Melt-in-the-Mouth—

10: Best melt-in-the-mouth in comparison with the reference product.
9: Significantly better melt-in-the-mouth in comparison with the reference product.
8: Relatively better melt-in-the-mouth in comparison with the reference product.
7: A little better melt-in-the-mouth in comparison with the reference product.
6: Slightly better melt-in-the-mouth in comparison with the reference product.
5: Melt-in-the-mouth equivalent to the melt-in-the-mouth of the reference product.
4: Slightly poorer melt-in-the-mouth in comparison with the reference product.
3: A little poorer melt-in-the-mouth in comparison with the reference product.
2: Significantly poorer melt-in-the-mouth in comparison with the reference product.
1: Poorest melt-in-the-mouth in comparison with the reference product.

"Melt-in-the-mouth" was evaluated by taking a degree of smoothness in passing through a throat during chewing and a degree of no feeling of powderiness on a tongue into consideration.

Test Example 2

With regard to the baked confectionery produced in the above-described Production Examples, penetration strength was measured by the measuring method shown below.

The penetration strength of the baked confectionery was measured using EZ-test manufactured by Shimadzu Corporation. Measurement conditions are shown below.

Test mode: texture
Test type: compression
Load cell capacity: 100 N
Control operation: down
Control: stroke
Test speed: 300 mm/min
Test specimen shape: flat plate
Data processing item: cutting strength H As an upper compression tool, P/N346-51813-02 was used.

A baked confectionery was placed on a center of a platform having a hole with 6 cm in a diameter such that both ends were balanced, the upper compression tool was set on an upper surface of the baked confectionery, and the cutting strength H, more specifically the penetration strength was measured under the above-described conditions. A unit of the penetration strength is N, and a limit of quantitation is 0.4 N.

The results are shown in Table 1 below.

TABLE 1

| | Breakdown | Reference Product | Present Invention 1 | Present Invention 2 | Present Invention 3 | Present Invention 4 | Present Invention 5 | Present Invention 6 | Present Invention 7 |
|---|---|---|---|---|---|---|---|---|---|
| Blend (mass part) | Margarine | 42 | 42 | 42 | 42 | 42 | 42 | 42 | 42 |
| | Salt-free butter | 24 | 24 | 24 | 24 | 24 | 24 | 24 | 24 |
| | Superfine sugar | 16 | 16 | 16 | 16 | 16 | 16 | 16 | 16 |
| | Skimmed milk powder | 27 | 27 | 27 | 27 | 27 | 27 | 27 | 27 |
| | Whole egg | 25 | 25 | 25 | 25 | 25 | 25 | 25 | 25 |
| | Cooking salt | 1 | 1 | 1 | 1 | 1 | 1 | 1 | 1 |
| | Wheat starch | — | 75 | 70 | 60 | 50 | — | 70 | — |
| | Corn starch | — | — | — | — | — | 70 | — | — |
| | Tapioca starch | — | — | — | — | — | — | — | 70 |
| | Wheat flour | — | — | — | — | — | — | — | — |
| | Wheat bran | — | 25 | 30 | 40 | 50 | 30 | — | 30 |
| | Barley bran | — | — | — | — | — | — | 30 | — |
| | Cellulose | — | — | — | — | — | — | — | — |
| | Whole wheat flour | 100 | — | — | — | — | — | — | — |
| | Gluten | — | — | — | — | — | — | — | — |
| Content in dough (mass %) | Insoluble dietary fiber | 4.30 | 4.62 | 5.54 | 7.39 | 9.23 | 5.54 | 5.21 | 5.54 |
| | Starch | 23.53 | 33.99 | 32.28 | 28.85 | 25.43 | 32.28 | 32.28 | 32.28 |
| | Fat and oil | 25.60 | 24.89 | 24.95 | 25.08 | 25.20 | 25.01 | 24.95 | 24.86 |
| | Gliadin | n.d. | 0.41 | 0.44 | 0.58 | 0.77 | 0.44 | 0.35 | 0.44 |
| Content in baked confectionery (mass %) | Insoluble dietary fiber | 4.93 | 5.29 | 6.35 | 8.47 | 10.59 | 6.35 | 5.97 | 6.35 |
| | Starch | 26.99 | 38.98 | 37.01 | 33.09 | 29.16 | 37.01 | 37.01 | 37.01 |
| | Fat and oil | 29.36 | 28.55 | 28.62 | 28.76 | 28.90 | 28.68 | 28.62 | 28.51 |
| | Gliadin | n.d. | 0.47 | 0.50 | 0.67 | 0.89 | 0.50 | 0.40 | 0.50 |
| Sensory evaluation | Brightness in appearance | 5 | 8 | 8 | 7 | 6 | 9 | 8 | 7 |
| | Hardness | 5 | 8 | 7 | 7 | 6 | 7 | 7 | 8 |
| | Melt-in-the-mouth | 5 | 8 | 7 | 7 | 5 | 8 | 8 | 8 |
| Measurement value | Penetration strength (N) | 20.7 | 6.9 | 7 | 10.9 | 12.2 | 8.7 | 14.1 | 14.9 |

| | Breakdown | Comparative Product 1 | Comparative Product 2 | Comparative Product 3 | Comparative Product 4 | Comparative Product 5 | Comparative Product 6 | Comparative Product 7 | Comparative Product 8 | Comparative Product 9 |
|---|---|---|---|---|---|---|---|---|---|---|
| Blend (mass part) | Margarine | 42 | 42 | 42 | 42 | 42 | 42 | 42 | 42 | 42 |
| | Salt-free butter | 24 | 24 | 24 | 24 | 24 | 24 | 24 | 24 | 24 |
| | Superfine sugar | 16 | 16 | 16 | 16 | 16 | 16 | 16 | 16 | 16 |
| | Skimmed milk powder | 27 | 27 | 27 | 27 | 27 | 27 | 27 | 27 | 27 |
| | Whole egg | 25 | 25 | 25 | 25 | 25 | 25 | 25 | 25 | 25 |
| | Cooking salt | 1 | 1 | 1 | 1 | 1 | 1 | 1 | 1 | 1 |
| | Wheat starch | — | — | 30 | 70 | 0 | — | 170 | 20 | 70 |
| | Corn starch | — | — | — | — | — | — | — | — | — |
| | Tapioca starch | — | — | — | — | — | — | — | — | — |
| | Wheat flour | 105 | 99 | — | — | 130 | 82 | — | — | — |
| | Wheat bran | 20 | 25 | 70 | 25 | 10 | 50 | 50 | 30 | — |
| | Barley bran | — | — | — | — | — | — | — | — | — |
| | Cellulose | — | — | — | — | — | — | — | — | 30 |
| | Whole wheat flour | — | — | — | — | — | — | — | — | — |
| | Gluten | — | — | — | 5 | — | 1.1 | — | — | — |
| Content in dough (mass %) | Insoluble dietary fiber | 3.34 | 4.19 | 12.93 | 4.62 | 1.58 | 7.89 | 6.1 | 7 | 12.77 |
| | Starch | 27.75 | 26.73 | 18.57 | 31.86 | 31.50 | 22.88 | 47.9 | 10.8 | 29.79 |
| | Fat and oil | 22.98 | 23.09 | 25.45 | 24.99 | 21.75 | 22.55 | 18.6 | 35.7 | 24.52 |
| | Gliadin | 2.66 | 2.64 | 1.02 | 2.60 | 2.89 | 2.89 | 0.7 | 0.8 | 0.00 |
| Content in baked confectionery (mass %) | Insoluble dietary fiber | 3.83 | 4.80 | 14.83 | 5.29 | 1.81 | 9.05 | 7.01 | 8.07 | 14.64 |
| | Starch | 31.82 | 30.65 | 21.30 | 36.54 | 36.12 | 26.24 | 54.92 | 12.4 | 34.16 |
| | Fat and oil | 26.35 | 26.48 | 29.18 | 28.66 | 24.94 | 25.86 | 21.3 | 40.9 | 28.12 |
| | Gliadin | 3.05 | 3.03 | 1.17 | 2.98 | 3.31 | 3.31 | 0.81 | 0.93 | 0.00 |
| Sensory evaluation | Brightness in appearance | 5 | 4 | 3 | 3 | 7 | 6 | — | — | 8 |
| | Hardness | 3 | 3 | 6 | 6 | 3 | 3 | — | — | 6 |
| | Melt-in-the-mouth | 5 | 5 | 3 | 6 | 6 | 5 | — | — | 7 |
| Measurement value | Penetration strength (N) | 28.6 | 29.6 | 17.1 | 21.3 | 25.1 | 28.3 | — | — | Limit of quantitation or lower | n.d.: Not determined

As shown in Table 1 above, the reference product is obtained by baking the dough prepared using the whole wheat flour, and a typical example of a conventional baked confectionery abundantly containing the insoluble dietary fiber. In various sensory tests described above, a relative evaluation was performed based on this reference product.

In Comparative Products 1 and 2, the wheat flour is blended therein, and therefore the content of gliadin is increased in comparison with the baked confectionery of the present invention. On the other hand, an amount of the wheat bran blended therein is small, and the content of the insoluble dietary fiber is smaller than the baked confectionery of the present invention. These Comparative Products 1 and 2 had harder food texture in comparison with the reference product. Moreover, as the content of the insoluble dietary fiber increases, the products were easily burnt and became darker in the appearance.

Comparative Product 3 is an example in which the content of the insoluble dietary fiber is increased up to a prescribed amount defined in the present invention by highly blending therein the wheat bran, and the content of gliadin is higher, although only slightly, in comparison with the baked confectionery of the present invention. This Comparative Product 3 was darker in the appearance and poorer in the melt-in-the-mouth in comparison with the reference product.

Comparative Product 4 is an example in which the content of gliadin increased, in comparison with the baked confectionery of the present invention, by blending therein a gluten preparation in addition to the gliadin contained in the raw materials. This Comparative Product 4 became darker in the appearance in comparison with the reference product.

Comparative product 5 is an example in which the content of the insoluble dietary fiber is smaller, and the content of gliadin is larger in comparison with the baked confectionery of the present invention. When the content of gliadin was higher in comparison with the baked confectionery of the present invention, the product was found to have harder food texture even when the amount of the insoluble dietary fiber was small.

Comparative Product 6 is an example in which the content of gliadin is higher in comparison with the baked confectionery of the present invention, which also resulted in hard food texture.

In the baked confectionery in the above-described Comparative Products 1 to 6, the penetration strength exceeded 17 N, and the baked confectionery was shown to be harder also from measured values obtained by analysis using the device.

On the other hand, Comparative Product 9 was prepared by blending cellulose as the insoluble dietary fiber, resulted in significantly low penetration strength to be brittle and fragile.

In contrast, in Present Inventions 1 to 7 being the baked confectionery of the present invention, the content of the insoluble dietary fiber is increased, and simultaneously the baked confectionery contains a suitable amount of the starch, and also the amount of the gliadin is suppressed. As a result, evaluations were equivalent to or better than the evaluations of the reference product in all evaluation items of the brightness in the appearance, the hardness of food texture, and the melt-in-the-mouth. Moreover, the penetration strength was smaller than 13 N for all, and the Present Inventions 1 to 7 were shown to be softer also from the measured values using the device in comparison with Comparative Products 1 to 6.

Having described our invention as related to this embodiments, it is our intention that the invention not be limited by any of the details of the description, unless otherwise specified, but rather be construed broadly within its spirit and scope as set out in the accompanying claims.

This application claims priority on Patent Application No. 2012-286931 filed in Japan on Dec. 28, 2012, which is entirely herein incorporated by reference.

The invention claimed is:

1. Baked confectionery comprising insoluble dietary fiber in an amount of from 5.0 to 11.0 mass %, starch in an amount of from 22 to 40 mass % and saccharide in an amount of from 0.1 to 30 mass %, wherein a content of gliadin in the baked confectionery is from 0.35 to 0.75 mass %, and the insoluble dietary fiber is insoluble dietary fiber derived from wheat bran.

2. The baked confectionery according to claim 1, wherein the baked confectionery comprises fat and oil, and a content of the fat and oil in the baked confectionery is from 10 to 40 mass %.

3. The baked confectionery according to claim 1, wherein the starch comprises at least one member selected from the group consisting of wheat starch, barley starch, rye starch, oats starch, corn starch, rice starch, legumes starch, potato starch, sweet potato starch, tapioca starch, water chestnut starch, chestnut starch, sago starch, yam starch, lotus root starch, arrowhead starch, bracken starch, lily bulb starch, and amylomaize starch.

4. The baked confectionery according to claim 1, wherein a moisture content in the baked confectionery is from 3 to 20 mass %.

5. A method of producing baked confectionery, the method comprising blending at least from 3 to 30 mass parts of saccharide and 3 to 80 mass parts of fat and oil, with 100 mass parts of a total amount of an ingredient (A) and an ingredient (B), to thereby prepare dough comprising insoluble dietary fiber in an amount of from 4.6 to 10.0 mass %, starch in an amount of from 15 to 37 mass % and gliadin in an amount of 0.05 to 0.8 mass %, and baking the dough,
wherein ingredient (A) is from 21 to 60 mass parts of insoluble dietary fiber-containing powder being wheat bran; and
wherein ingredient (B) is starch in an amount of mass parts to be 100 mass parts in a total including the (A).

6. The production method according to claim 5, wherein the ingredient (B) comprises at least one member selected from the group consisting of wheat starch, barley starch, rye starch, oats starch, corn starch, rice starch, legumes starch, potato starch, sweet potato starch, tapioca starch, water chestnut starch, chestnut starch, sago starch, yam starch, lotus root starch, arrowhead starch, bracken starch, lily bulb starch, and amylomaize starch.

7. The production method according to claim 5, wherein a blending amount of the fat and oil in the dough is from 10 to 70 mass parts, with respect to 100 mass parts of a total blending amount of the insoluble dietary fiber-containing powder comprising the bran of wheat variety and the starch.

8. Baked confectionery comprising insoluble dietary fiber in an amount of from 5.29 to 10.59 mass %, starch in an amount of from 29.16 to 38.98 mass %, and fat and oil in an amount of from 10 to 40 mass %, wherein a content of gliadin in the baked confectionery is from 0.40 to 0.89 mass %, and the insoluble dietary fiber is insoluble dietary fiber derived from wheat bran.

9. The baked confectionery according to claim 1, wherein a penetration strength of the baked confectionery is from 6.9 to 14.9 N.

10. The production method according to claim 5, wherein a penetration strength of the baked confectionery is from 6.9 to 14.9 N.

11. The baked confectionery according to claim 8, wherein a penetration strength of the baked confectionery is from 6.9 to 14.9 N.

* * * * *